Nov. 8, 1960    N. E. ALEXANDER ET AL    2,959,052
SPHERICAL ANEMOMETER

Filed Dec. 10, 1957    2 Sheets-Sheet 1

INVENTORS
Nelson E. Alexander
William H. Thompson
Frank X. McNally
BY George Renehan
ATTORNEY INVENTORS
Nelson E. Alexander
William H. Thompson
Frank X. McNally
BY
ATTORNEY

United States Patent Office 2,959,052
Patented Nov. 8, 1960

2,959,052

SPHERICAL ANEMOMETER

Nelson E. Alexander, 1201 Motter Ave., Frederick, Md.; William H. Thompson, 1317 Reo Road, Lansing 10, Mich.; and Frank Xavier McNally, 3614 Telmar Road, Baltimore, Md.

Filed Dec. 10, 1957, Ser. No. 701,948

1 Claim. (Cl. 73—189)

(Granted under Title 35, U.S. Code (1952), sec. 266)

The invention described herein may be manufactured and used by or for the Government of the United States of America for governmental purposes without the payment to us of any royalty thereon.

This invention relates to an anemometer for measuring air velocity as a resultant of vector quantities. More specifically, it relates to an anemometer wherein a sphere exposed to air movement is suspended in three planes with suitable means to measure the force exerted upon the sphere in the three planes.

Figure 1:
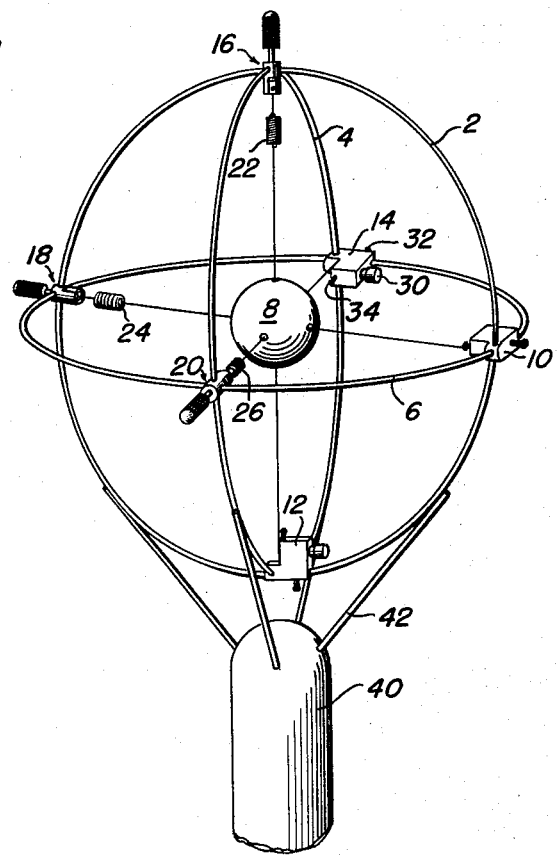
Figure 2:
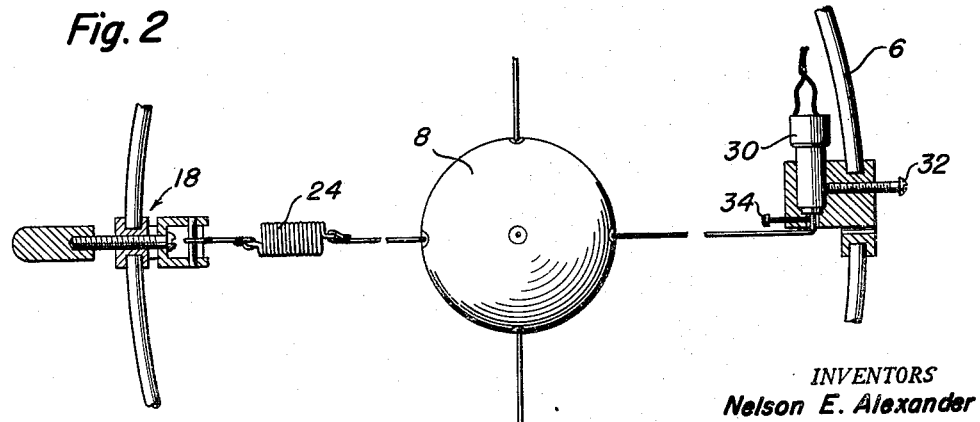
Figure 4:
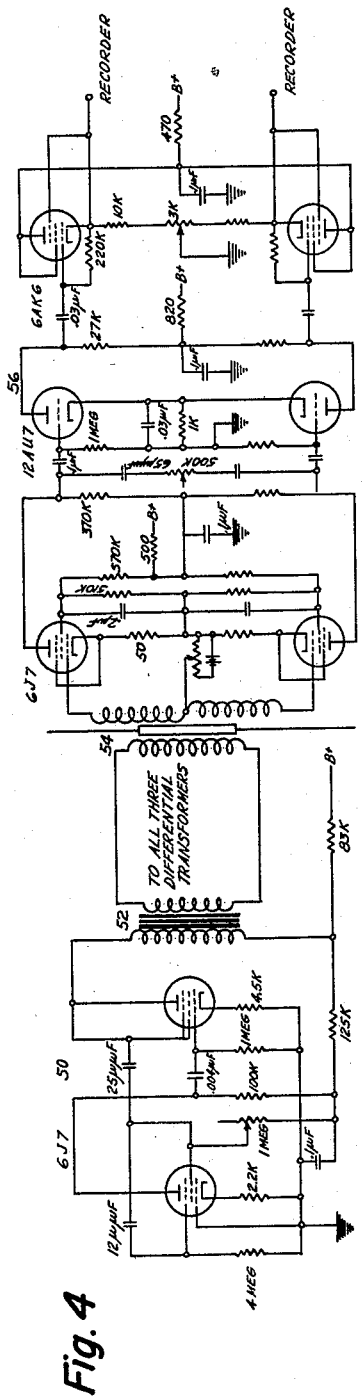

In the drawings Fig. 1 is a perspective view of the instrument. Fig. 2 shows a section through the horizontal axis, and Figs. 3 and 4 are diagrams of electronic circuits involved.

Specifically, 2, 4 and 6 represent the two vertical and the horizontal meridian frames which support the central sphere 8. At the intersections of the meridians are positioned attachments 10, 12 and 14 which support strain sensitive units in three planes. The diametrically opposed supporting points have adjustable spring attachments 16, 18 and 20. Wires pass from each spring supported point to the central sphere and another wire continues from the sphere to the diametrically opposed strain sensitive unit. The frame transducer mountings, suspending wires and spring tension units 22, 24 and 26 are constructed of a corrosion resistant and low thermal expansion alloy such as Invar. This type of construction minimizes strains and distortions due to ambient temperature changes. The spring tension units are so adjusted that a force applied to the sphere in either direction along the axis of suspension results in a movement of the strain sensitive element. This element may be of several types. In the drawings (Fig. 2) it is shown as a mechano-electronic transducer 30 such as RCA-5734. This type of transducer has an anode which is supported on a shaft projecting from the tube shell. Stress applied to this shaft varies the interelement spacing and thereby the anode current. Other strain sensitive elements may be used including moving coil or moving magnet generators, moving core differential transformers, as well as piezo-crystal elements.

Figure 3:
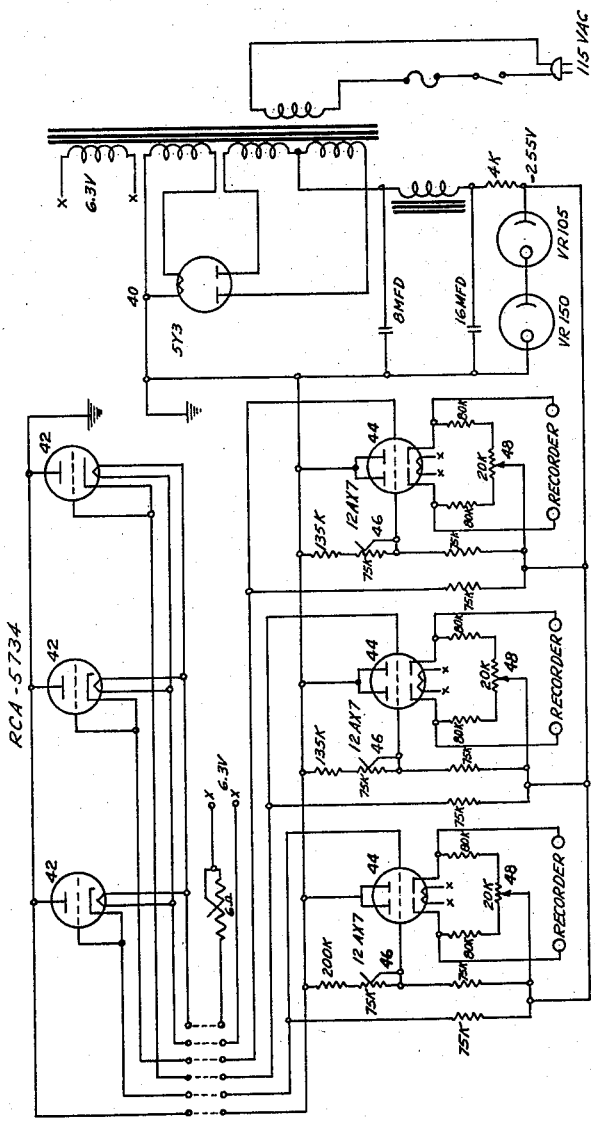

In the present embodiment, the mechano-electronic transducer 30 is shown (Fig. 2) and its position and function in an electronic circuit appears in Fig. 3. Since there is a limit to anode motion of about $.5° \neq$ or .005 inch, within which the transducer is linear and within which there will not be permanent deformation in the unit, it is necessary to provide a set screw 34 to limit motion in tension. Another set screw 32 retains the transducer in position. The entire anemometer is fixed on supports 40 and 42.

The recorder circuit for the mechano-electronic transducer is shown in Fig. 3. The circuit consists basically of a power supply 40 with a transformer supplying a filtered and stabilized negative potential of —255 volts which supplies the three transducers 42 and the three 12AX7 dual triodes 44. All anodes in the circuit are grounded and the supply potential is applied in the cathode circuits. In each of the dual triodes, one grid is given a controlled negative bias while the other grid is coupled to the cathode of the appropriate transducer. The dual triodes have cathode follower outputs which are coupled to a strip chart recorder. The transducers function as variable resistors in one arm of a D.C. Wheatstone bridge circuit. The adjustable adjacent arm of the bridge consists of the fixed and variable resistor 46 to the grid of the first section of the dual triode. The opposite arms of the bridge are connected together and to the negative supply. Under zero wind conditions, the bridge is balanced when both grids are at the same potential and the current through the external strip recorder is zero. The potentiometer 48 across the dual cathodes provides a means of adjusting for individual variations between the two triodes. By means of this circuit a continuous record value representing wind velocity along three axes is secured. The information from the three axes may be combined vectorially to yield the instantaneous direction and velocity. Alternatively, information from the two horizontal axes may be combined vectorially to yield horizontal wind direction and velocity and the vertical output may be treated by integration of positive and negative values to yield the net rise or fall of air by difference in a given period of time. Finally, one horizontal axis may be orientated in the mean direction of the wind. This axis then records fluctuations in wind velocity and the other axes record the horizontal and vertical crosswind velocities.

The instrument is constructed with a lightweight central sphere about 3" in diameter, constructed of hollow plastic material, or of plastic foam. The resulting low inertia coupled with the small movement of the sensing parts provides good frequency response making the instrument capable of following and recording rapidly changing wind conditions associated with gusts and turbulence. Also, the small movements result in substantially independent readings on the several axes.

The instrument is calibrated in wind tunnel tests at air speeds up to 20 m.p.h. At the lower air speeds the force exerted on the smooth sphere is essentially linear but as air speeds increase a quadratic curve obtains. After determining the resultant curve in the three axes, the instrument is ready for use and the three components of wind velocity may be read directly off the curves.

Another variation of transducer is a differential transformer shown in Fig. 4. In this modification, an oscillator 50 supplies a fixed frequency to a transformer primary, the secondary of which is coupled to windings in each of three differential transformers. The moving core 54 of the transformer which is the moving element in the transducer is center positioned so that any movement from this position causes simultaneously a greater coupling to one side and a lesser coupling to the other of the two halves of the transformer secondary. Each of these transformer secondary halves are connected to the two input grids of a three stage push pull amplifier 56. The last stage is a cathode follower that is connected to a recorder in the same manner as obtained in the mechanoelectronic transducer. The differential transformer movable core is spring centered and is connected to the sphere suspension wires in the usual manner. This differential transformer type of transducer possesses several features of superiority including high zero drift stability.

Other sensing unit modifications including piezo-electric crystal units as well as capacitative sensing elements are contemplated in this invention.

We claim:

An instrument for recording wind velocity and direction comprising a meridian framework, three wires supported within said framework at about 90° to each other and intersecting at a point approximately in the center of each of the wires, a small lightweight sphere positioned at the point of intersection of said wires and supported by said wires, means for attaching said wires to said framework comprising spring means positioned on the framework at one end of each of said wires and mechano-electronic transducer means comprising a cathode and a movable anode positioned on the framework opposite each of said spring means, said wires being suspended between said spring means and the anode of said opposite transducer in each case, amplifier means in association with said transducers for amplifying the output of said transducers.

References Cited in the file of this patent

UNITED STATES PATENTS

| | | |
|---|---|---|
| 2,377,212 | Cottrell | May 29, 1945 |

FOREIGN PATENTS

| | | |
|---|---|---|
| 585,140 | Great Britain | Jan. 30, 1947 |
| 771,421 | Great Britain | Apr. 3, 1957 |
| 155,923 | Sweden | Sept. 4, 1956 |